Dec. 20, 1966 D. A. MacLEOD 3,293,370

MAKE BUSY LINE CIRCUIT FOR KEY TELEPHONE SYSTEMS

Filed Dec. 30, 1963 5 Sheets-Sheet 1

INVENTOR
D. A. MacLEOD
BY S E Hollander
ATTORNEY

Dec. 20, 1966 D. A. MacLEOD 3,293,370

MAKE BUSY LINE CIRCUIT FOR KEY TELEPHONE SYSTEMS

Filed Dec. 30, 1963 5 Sheets-Sheet 2

MAKE BUSY LINE CIRCUIT FOR KEY TELEPHONE SYSTEMS

Filed Dec. 30, 1963 5 Sheets-Sheet 3

MAKE BUSY LINE CIRCUIT FOR KEY TELEPHONE SYSTEMS

Filed Dec. 30, 1963 5 Sheets-Sheet 5

United States Patent Office 3,293,370
Patented Dec. 20, 1966

3,293,370
MAKE BUSY LINE CIRCUIT FOR KEY TELEPHONE SYSTEMS

Donald A. MacLeod, Oakland, Calif., assignor to American Telephone and Telegraph Company, New York, N.Y., a corporation of New York Filed Dec. 30, 1963, Ser. No. 334,235
7 Claims. (Cl. 179—18)

This invention relates to telephone systems and more particularly to the type of control facilities known generally as telephone line circuits.

Telephone line circuits are employed to perform various control and supervisory functions incident to the establishment of a connection between a common switching point such as a central office or PBX and one or more telephone sets at a subscriber's premises. In the case of a line circuit serving a plurality of telephone sets in a key telephone system, for example, the functions typically performed include: signaling a particular subscriber station in response to a central office or PBX ringing signal; holding that line in response to manual key operation by the subscriber; and indicating by means of visual or audible signals, the line being call, held, or busied. Moreover, the line circuits are normally employed in a manner so as to allow continued access to all of the lines appearing on a key set in such systems.

Instances exist, however, where it is desirable to immediately make a station busy after a call is received on one of the lines terminating thereon so that access to all of the other lines appearing at the key set is blocked to subsequent calls while the existing call is in progress.

A typical situation which presents itself is the case which exists in certain business offices where both manual PBX equipment and automatic connecting equipment exist simultaneously to operate in conjunction with key telephone units. Each switching arrangement may be peculiar to a particular group of callers requiring a specific standard of service. Thus, in a telephone company business office the lines manually connected to the key station may be customers of the business and the lines automatically switched may be intracompany business line calls.

A problem inherent in existing systems of this type is an unguarded interval of time which exists from the time just after a PBX attendant has tested a particular key station for busy and manually connected "a customer" to a line on that station, and just before ringing or lamp flash begins. During this time interval an intracompany business line call which is automatically switched through line position links may be put through to another line position at the same station since the station has not been busied to all the other incoming calls. Customarily, it is normal practice in the type of system described above to busy a station only after the switchhook contacts are actuated, thereby preventing further incoming calls to the station so that the station attendant may give uninterrupted service to a calling customer.

With the present system, despite the fact that a manually connected call may be the first to be put through to the key station it is possible that the automatically connected intracompany business line (ICBL) call will begin ringing and lamp flash before the manually connected "customer call," and the key station attendant will answer the former before the presence of the latter is even made known. Thus, an undesirable situation arises, in that, the first connected "customer" who is supposed to be preferentially treated is not answered first, or is answered only after the (ICBL) call and is caused to suffer the inconvenience of being held, or is not answered until the other call is disposed of. Obviously, the service rendered such customers can thus be improved if this unguarded interval of time is eliminated.

Accordingly, a specific object of the invention is to prevent any calls from being connected to any of the incoming lines on a key station after a first has been seized.

Another object of the invention is to prematurely busy a key station before any call appearing thereat has been answered.

These and other objects are achieved in accordance with the principles of the invention by employing a telephone line circuit for a key telephone system which is immediately responsive to the establishment at the manual PBX of a connection to the key station to both initiate local ringing and to energize a position busy relay which in turn precludes the possibility of further connections thereto. An incoming call characterized by either a change of potential on, or by ringing current applied to, the ring conductor, is detected by a detector arrangement including a diode rectifier which drives a transistor switch which in turn controls a relay to initiate both the local ringing and the energization of the position busy relay. Once the position busy relay associated with the particular station is energized, connection to all other lines on that station, including those from the automatically switched or intracompany business lines (ICBL), is prevented.

In the situation where the first incoming call is of the automatically switched type, as soon as a station is seized and before the switchhook contacts are actuated in response to an answering condition, the position busy relay is energized to cause the station to present a busy condition to both other incoming ICBL calls and also to other manually connected calls.

These and other objects and features of my invention may be more readily comprehended from an examination of the following description, together with the accompanying drawing, in which.

I. GENERAL DESCRIPTION OF OPERATION

Figure 1:
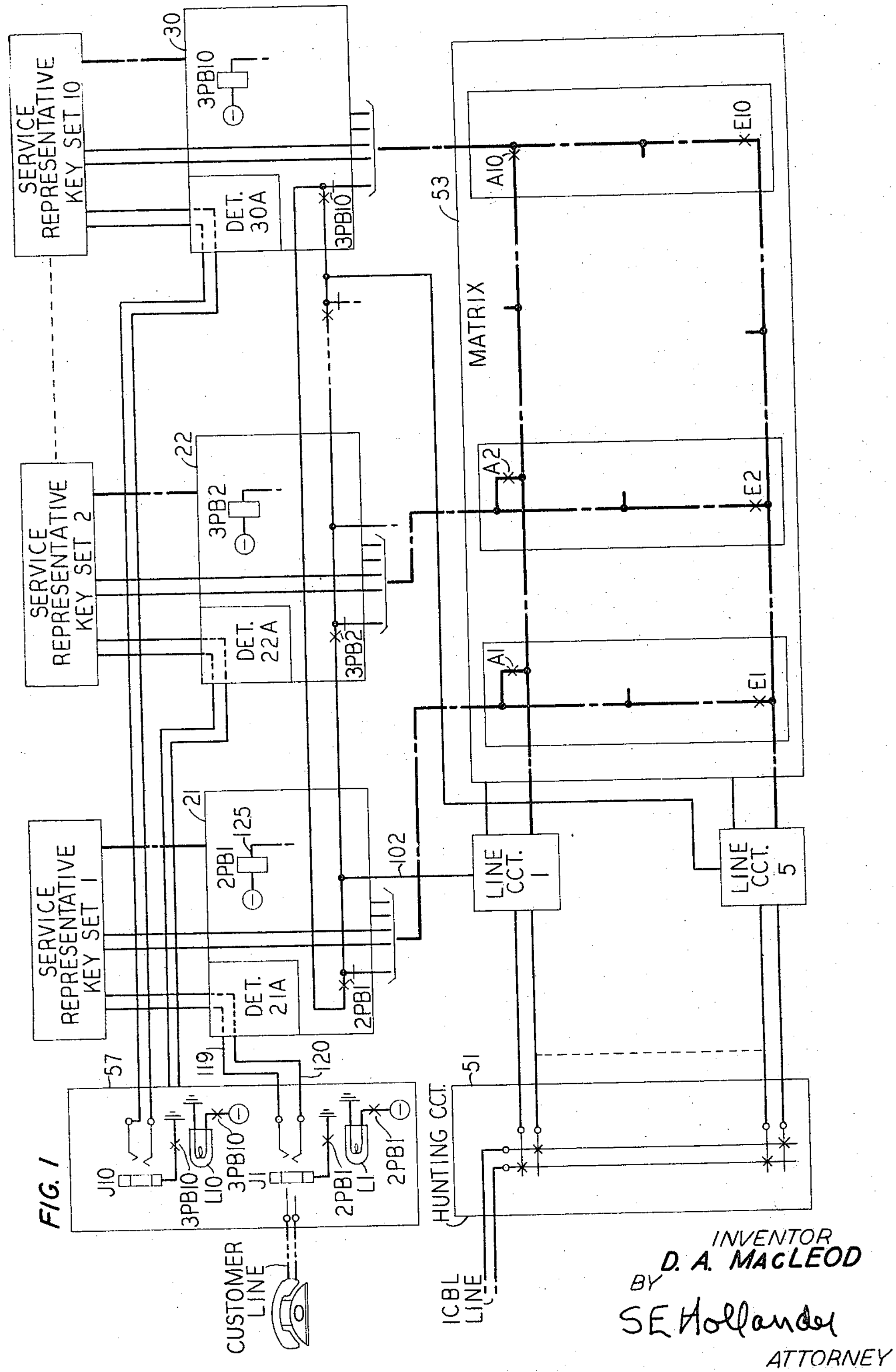
FIG. 1 is a block diagram showing the relationship of the various components of a specific illustrative embodiment of the system.

With reference to FIG. 1, it may be seen that two types of incoming lines to a business office are shown. The first is intracompany business lines, or ICBL lines, which are automatically switched through a line link matrix 53 to a key station, and the second type is customer lines which are manually connected to a key station.

The arrangement shown describes a circuit which will prematurely or immediately busy any one station in response to the receipt of a call at any one of its key positions from either an ICBL call or a customer call before the switchhook contacts are actuated to answer the call.

A. *Establishment of an ICBL call*

A business colleague or fellow employee desiring to reach a service representative initiates a call by dialing the appropriate number on an intracompany business line at a central office or distant PBX. A connection is established to hunting circuit 51 which acts in a familiar manner to select an idle line circuit, illustratively, line circuit 1. Line circuit 1 selects and closes in matrix switch 53 an idle crosspoint in a column which corresponds to an idle service representative. Assuming the service representative at key set 1 is idle, crosspoint A1 is closed to thereby continue the connection from the caller to key set 1; to simultaneously operate the associated position busy relay 2PB1 (whose function will be described below), by connecting a ground to conductor 125; and to initiate local ringing and lamp flash at the key set. The operation of relay 2PB1, establishes a connection of ground to the sleeve lead of jack J1 and energizes lamp L1 at the manual PBX 57 position corresponding to key set 1. The transfer contacts of relay 2PB1 shown in key set line circuit 21 are also operated.

B. *Establishment of a manual call*

Figures 2, 6:
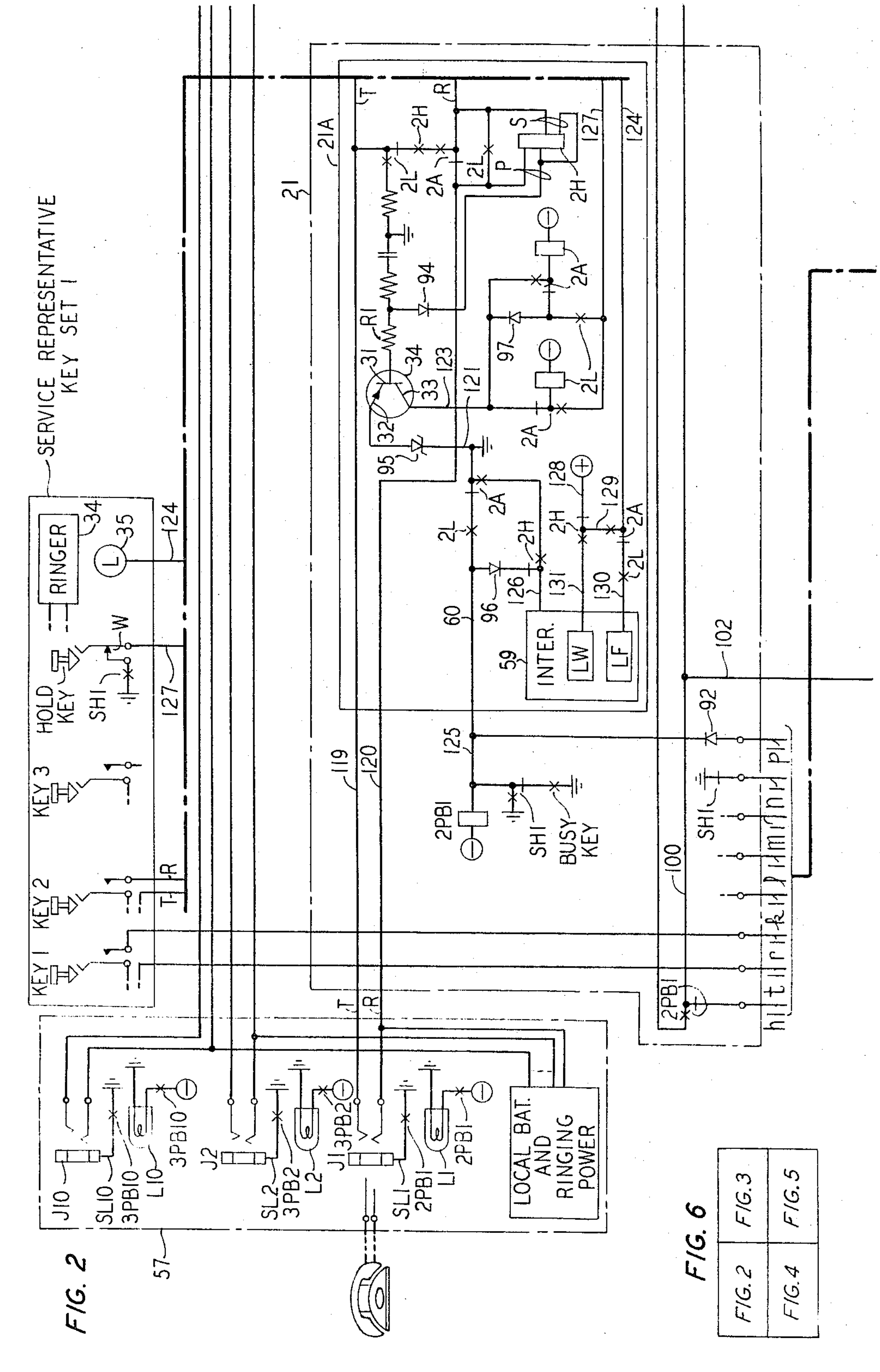
FIG. 2 is a schematic diagram showing the manual PBX, key set and key station line circuit in detail.
FIG. 6 shows the interrelationship of FIGS. 2 through 5.
Figure 3:
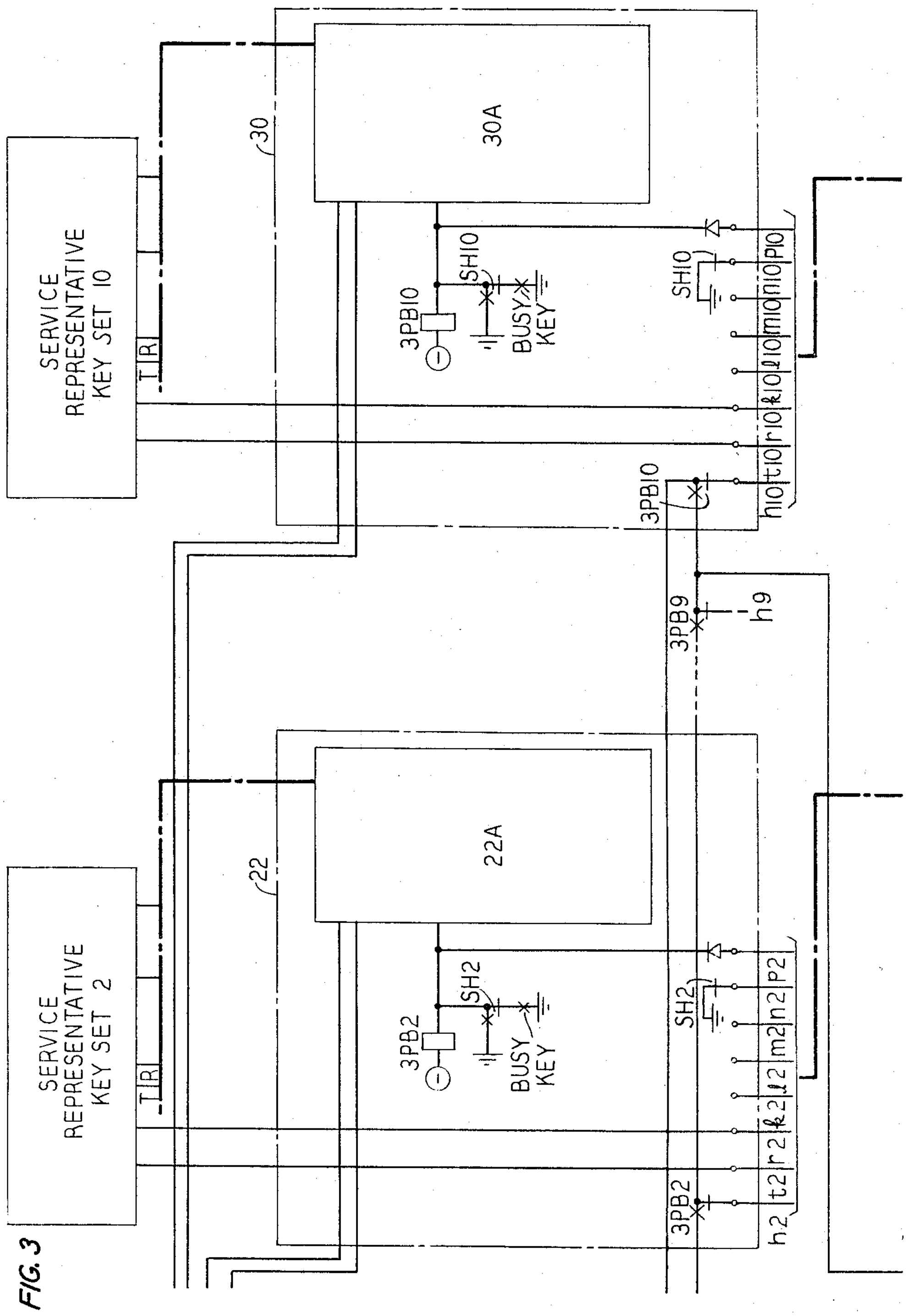
FIG. 3 shows, symbolically, additional key sets and their corresponding line circuits.
Figure 4:
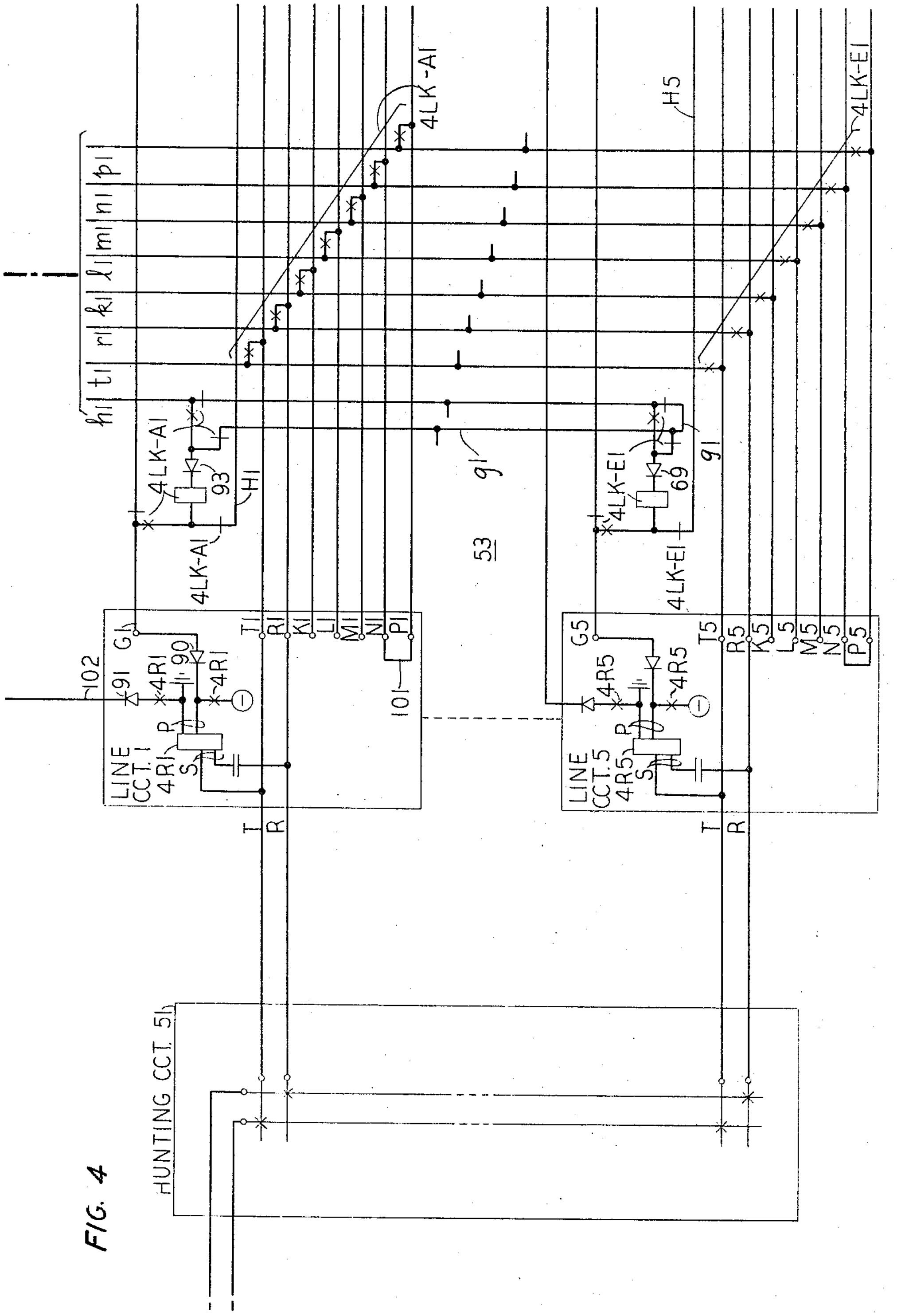
FIG. 4 is a diagram showing a hunting circuit in symbolic form, the essential parts of the automatically connected ICBL call line circuit and the schematic diagram of part of the switching matrix.
Figure 5:
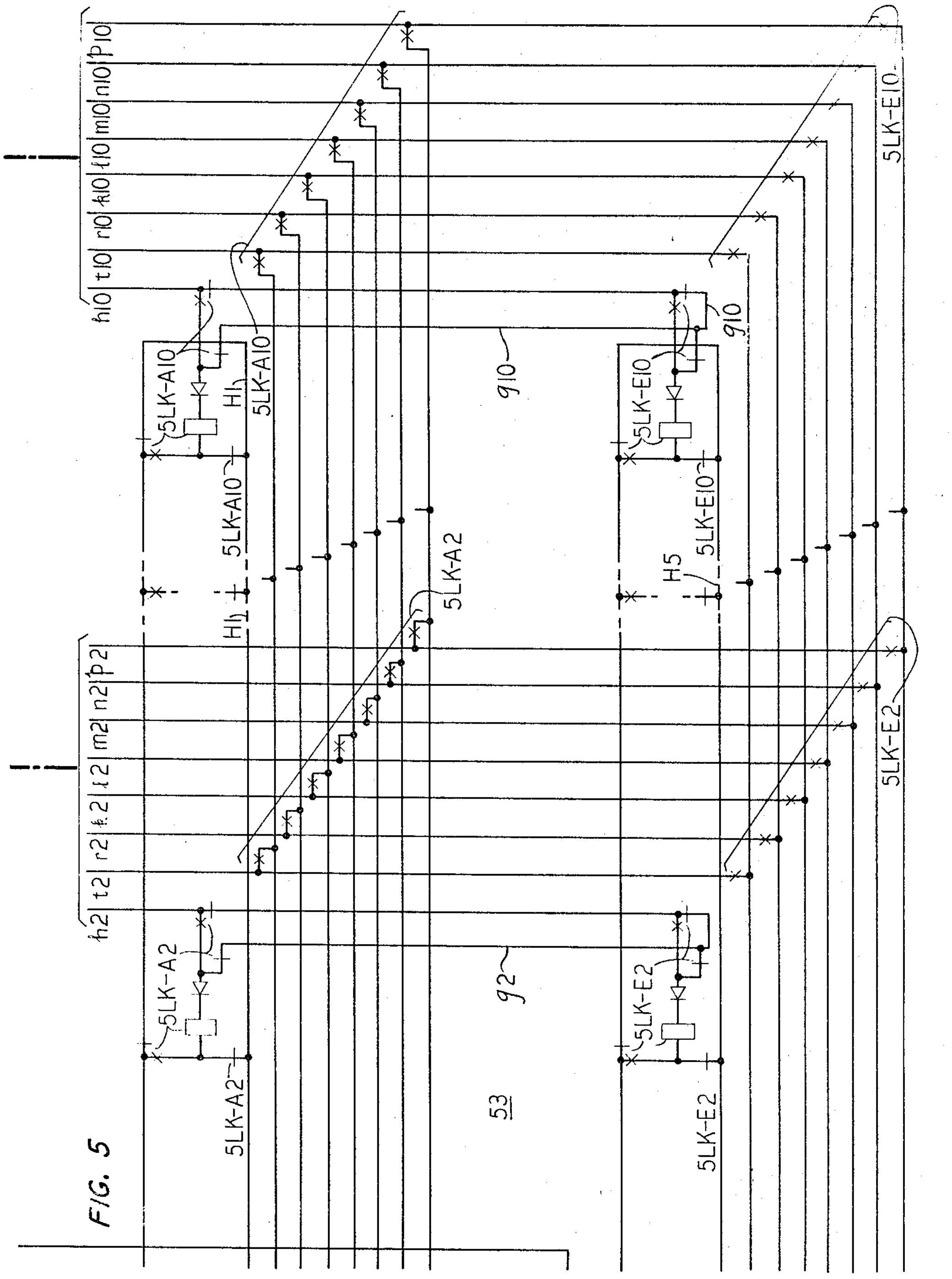
FIG. 5 is a schematic of the remaining part of the switching matrix.

A business caller or customer in need of service dials the local telephone company business office and appears at a jack position on manual PBX 57. The PBX attendant thereupon manually connects the waiting customer to an idle service representative jack position which extends to the talking conductors directly to the key set 1 through detector 21A. Ringing and lamp flash are begun at the instance of the attendant after the connection is established. Detector 21A (shown in detail in FIG. 2) in key station line circuit 21 (which corresponds to both key set 1 and jack position J1) recognizes a change in potential on ring conductor 120 (caused by the connection being established) and responds thereto to energize relay 2PB1 as described herein. Relay 2PB1 upon being energized causes lamp L1 to be lighted and applies ground to the sleeve of jack J1 as described previously.

C. *Establishment of an ICBL call with a pre-existing call in process*

Assuming the service representative at key set 1 is busy with a call in progress and, therefore, relay 2PB1 is energized, an incoming ICBL call which appears first at hunting circuit 51 is connected to a service representative at other than key set 1 in the following manner: Hunting circuit 51 in a familiar manner selects an idle line circuit 1, which thereupon proceeds to select and close a crosspoint appearing in a particular column of matrix 53 in which no crosspoint is closed. Line circuit 1 examines the state of the transfer contact of operated relay 2PB1 in key set line circuit 21 by means of conductor 102, determines thereby that key set 1 is busy and proceeds to examine the busy state of the next key set in the chain-key set 10. Crosspoint A1 is thereby prevented from being selected and closed.

The examination of the transfer contacts of each of the position busy relays in each key set line circuit is sequentially continued until an idle service representative as evidenced by an unenergized position busy relay is found. In the illustration at hand, after line circuit 1 determines that relay 2PB1 is operated because key set 1 is busy, the next examination is made of the position busy relay 3PB10 in key set line circuit 30. Upon determining that key set 10 is idle, crosspoint A10 in matrix 53 is closed and a connection is established thereto, as described previously.

D. *Establishment of a manual call with a pre-existing call in process*

Assuming again that key set 1 is busy, the PBX attendant desiring to connect a customer awaiting service to a service representative, scans the lamps associated with each jack position appearing at the PBX and tests the sleeve lead associated with a jack position having an unlighted lamp. The attendant will not test jack position J1 because of the busy indication given by lighted lamp L1 (see IA supra.) Assuming lamp L10 is not lit, the attendant tests the sleeve lead terminal J10 for a ground potential as indicated, and in the absence of such establishes the connection from the awaiting customer to key service representative at key set 10.

The invention described thus busies a called line prior to the time it is answered by the key set attendant, and moreover, it also busies all of the other lines appearing on the key set even though there is no call appearing thereon. All of the lines, and consequently the entire key set, are made busy immediately after the position busy relay associated with the key set in question is operated and even before lamp flash or ringing begin.

II. DETAILED DESCRIPTION OF OPERATION

*Establishment of an ICBL call*

Referring to FIGS. 2 through 5, an incoming ICBL call appearing at an incoming ICBL line circuit 1 causes relay 4R1 to be energized by the application of ringing current to its secondary winding S. Relay 3R1 thereupon locks up through its primary winding P over a path which includes battery, make contact of relay 4R1, winding P of relay 4R1 to ground. The energization of relay 4R1 causes the application of battery to one terminal of each of the relay windings 4LK–A1, SLK–A2, 5LK–A3 through 5LK–A9 (not shown), 5LK–A10 (in the matrix row) associated with line circuit 1 over a path which includes battery, make contact of relay 4R1, diode 90, conductor G1, transfer contact of relay 4LK–A1, transfer contact of relay 5LK–A2, transfer contacts of relays 5LK–A3 through 5LK–A9 (not shown), transfer contact of relay 5LK–A10 to conductor H1. Thus, conductor H1 has battery potential applied thereto and each relay 4LK–A1 through 5LK–A10 has battery applied to one terminal of its winding from conductor H1 through its own break contact. Simultaneously, ground is applied from the ICBL line circuit 1 through make contact 4R1, diode 91, conductor 102 to transfer contact of relay 2PB1 in outgoing key station line circuit 21 associated with key station 1. In the event that key station 1 is not in a busy condition as a result of some previous connection thereto, relay 2PB1 is in a de-energized condition and the ground appearing on conductor 102 continues through the break contact of the transfer contact of relay 2PB1 to conductor *h*1 associated with line circuit 21, through break contacts of relays 4LK–A1, 4LK–B1 to 4LK–D1 (not shown), and 4LK–E1, to apply ground to conductor *g*1 and to a second terminal of windings of relays 4LK–A1, 4LK–B1 through 4LK–D1 (not shown) and relay 4LK–E1 through a break contact and a diode associated with each of the windings of relays 4LK–A1 through 4LK–E1. Thus, only relay 4LK–A1 has battery applied to one terminal of its winding and ground applied to the other terminal of its winding. All other relays in the matrix row which contain relay 4LK–A1 have battery connected to one winding terminal but do not have ground through to the other winding terminal. Similarly, all relays in the matrix column containing relay 4LK–A1, with the exception of relay 4LK–A1, have ground applied to one winding terminal but have no battery applied to the other winding terminal. Therefore, only relay 4LK–A1 in matrix switch 53 is energized.

It is to be noted that diodes in series with each relay –LK– winding are inserted to prevent false operation of matrix relays by means of sneak current paths.

The energization of relay 4LK–A1 continues the connection of tip and ring (T and R conductors) from incoming ICBL line circuit 1 (conductors T1 and R1) to outgoing line circuit 21 (conductors *t*1 and *r*1) through make contacts 4LK–A1, and energizes relay 2PB1 by applying ground from line circuit 21 through the closed switchhook contact SH1, to conductor *n*1 through make contact of relay 4LK–A1, along conductor *n*1 to line circuit 1, conductor 101, conductor *p*1, make contact of relay 4LK–A1, conductor *p*1, diode 92, conductor 125, winding of relay 2PB1 to battery. Simultaneously, relay 4LK–A1 locks up through its own contacts over a path which includes battery, make contact of relay 4R1, diode 90, conductor G1, transfer contact of relay 4LK–A1, winding of relay 4LK–A1, diode 93, transfer contact of relay 4LK–A1, conductor *h*1 which is connected to ground as described previously. The operation of relay 4LK–A1 prevents subsequent seizures of any other relays 5LK–A– in the matrix row 1 corresponding to line circuit 1, since the transfer contact of relay 4LK–A1 in series with conductor G1 interrupts the path for battery current to all other relays in the row. Also, all of the other relays in the matrix column corresponding to relay 4LK–A1 are prevented from operating because of the operation of transfer contact of relay 4LK–A1 in conductor *h*1 which interrupts the ground potential. The closure of the other crosspoints of the matrix switch 4LK–A1 also connects conductors K1, L1, and M1 from ICBL line circuit 1 to *k*1, *l*1, *m*1, respectively, in key station line unit 21 to cause the initiation of conventional local ringing and lamp flash (not shown) in key set 1 by exciting ringer 34 and lamp 35 contained therein. The operation of relay 2PB1 causes lamp L1 in manual PBX 57 to light in an obvious manner and puts a ground on the sleeve lead SL1 at jack position J1. The ground on the sleeve lead and the lighted lamp provide electrical and visual means for indicating that key station 1 is in a busy state.

B. ESTABLISHMENT OF A MANUAL CALL

1. *Line signal and answer*

In response to customer requests for service the attendant at the PBX position manually connects the waiting customer to an idle jack terminal position after scanning and testing for an idle line. It will be assumed key station position J1 is found idle and connection made thereto. Immediately after the establishment of the connection, key station line circuit 21 responds to apply ground to conductor 60, which ground is thereafter applied to energize relay 2PB1 in a manner to be described below.

The incoming call is detected at the station by the change from ground on the ring conductor 120. This change may be to either negative trip battery, talk battery or 20-cycle ringing power applied by the attendant from the manual PBX station. The 20-cycle ringing power or negative battery passes through rectifier 94 and causes transistor 34 to conduct by means of the bias path which includes ring conductor 120, paralleled windings P and S of relay 2H (the windings are paralleled because of the closed break contact of unenergized relay 2A), diode 94, resistor R1, base 31 of transistor 34, emitter 32 of transistor 34, diode 95, conductor 121 to ground. This biases the base emitter junction of transistor 34 in the forward direction and allows collector current to flow through transistor 34 in a manner to enable the energization of relay 2L. This path includes negative battery, winding of relay 2L, transfer contacts of relay 2L, conductor 123, collector 33 and emitter 32 of transistor 34, diode 95, conductor 121 and ground. The operation of relay 2L establishes a connection from ground to activate interrupter 59 which initiates both local ringing (via tip and ring conductors 119 and 120) and lamp flash (via conductor 130, make contact of relay 2L, transfer contact of relay 2A and conductor 124) at key station 1 over a path which includes ground, transfer contact of relay 2A, make contact of relay 2L, diode 96, transfer contact of relay 2H, to conductor 126.

Ground is also applied by the operation of relay 2L to energize relay 2PB1 in key station 1 over a path which includes ground, transfer contact of relay 2A, make contact of relay 2L, conductor 60, conductor 125, winding of relay 2PB1 and battery. In the same manner as before, the energization of relay 2PB1 causes the jack terminal J1 at the manual PBX to appear busy both visually and electrically by means of lamp L1 and the ground on sleeve lead SL1, while also causing in the manner described above, the busying of the outgoing ICBL line circuit 21

(by the operation of the transfer contact 2PB1 in line circuit 21 which diverts any subsequent calls to the adjacent line circuit 30). When key station 1 is answered ground is applied to conductor 127 through the switchhook contacts (as represented by contacts SH1) to operate relay 2A over a path which includes ground, contacts SH1, switch W, conductor 127, make contact of relay 2L, transfer contact of relay 2A, winding of relay 2A, to battery. Relay 2A is held operated over two paths, the first of which is substantially identical to the energizing path described (except that diode 97 and the operated transfer contact of relay 2A now replace the function performed by the break contact of transfer contact of relay 2A) and the second of which is from ground, conductor 121, diode 95, emitter 32 and collector 33 of transistor 34, transfer contact of relay 2A, winding of relay 2A to battery. Energized relay 2A also closes steady lamp power to the key station over a path which includes battery, conductor 128, transfer contact of relay 2H, conductor 129, transfer contact of relay 2A and conductor 124 while also transferring control of relay 2L from transistor 30 to conductor 127 (because of the operated transfer contact of relay 2A).

2. *Hold*

The line circuit is also capable of performing a hold function in response to the actuation of a hold key at the key station which removes ground from conductor 127 by opening switch W. This causes the release of relay 2L which removes the short across the windings of relay 2H. Relay 2H now operates in series with the loop which has battery applied on the tip conductor 119 and ground applied to the ring conductor 120 (by familiar means, not shown). The path includes ground, conductor 120, primary winding P of relay 2H, secondary windings of relay 2H, receiver impedance across conductors T and R, conductor 119 and battery. The operation of relay 2H completes a short circuit path across the station tip and ring or conductors 119 and 120 at the station side of the line (transfer contact of relay 2L, make contact of relay 2H and transfer contact of relay 2A) and applies lamp wink power from interrupter 59 over a path which includes conductor 131, transfer contact of relay 2H, conductor 129, transfer contact of relay 2A to key station 1.

Relay 2A is held operated by transistor 31 which is held in conduction by the base current from the midpoint of the winding of relay 2H which is at a potential sufficiently negative so as to effectively forward bias the base-emitter junction of transistor 31. When the station subsequently depresses the line button to release the hold condition, ground reappears on conductor 127 through switch W and relay 2L is reoperated over a path from battery, winding of relay 2L, transfer contact of relay 2A, conductor 127, switch W, switchhook contact SH1 and ground. The operation of relay 2L reinserts the short across the windings of relay 2H thereby causing the release of relay 2H and the removal of the short across the talking conductors 119 and 120.

3. *Disconnect*

When the key station hangs up, the disconnect function is performed by the line circuit in response to the removal of ground by the switchhook contacts from conductor 127 by releasing relay 2L over the holding path described previously. When the line circuit in the central office or PBX returns to normal, battery is removed from the ring conductor 120, transistor 34 is biased in the off state and relay 2A is released since, at this time ground is removed from both the collector circuit of transistor 34 and from conductor 127. The busy lamp remains lit until relay 2A has released.

4. *Outgoing call*

When the station comes off hook to place an outgoing call, the closed loop causes the dial tone connection to be established in the central office or PBX in a standard manner. Under this condition, the potential at the midpoint of the relay 2H winding is sufficiently negative to turn on transistor 34 over the path described above. The operation of transistor 34 causes the operation of relay 2L in a similar manner and enables relay 2A to operate because of the ground placed by the station on conductor 127 as above. In a similar manner the operation of relay 2A transfers control of relay 2L to conductor 127.

5. *Summary*

Thus, the arrangement presented herein, provides a means for obtaining an instantaneous response to a manual connection made by the PBX attendant to the station key set. As a result of a connection and before either lamp flash or local ringing take place a ground is placed on the winding of the position busy relay of the key station set associated therewith, to immediately and prematurely (before the onset of the off-hook condition) busy the station. Local ringing and lamp flash follow in sequence. In addition, the line circuit is still capable of performing the normal line circuit functions of line signal, answer, hold, disconnect and outgoing call.

B. DETAILED DESCRIPTION OF CONCURRENT OPERATION WHEREIN THE FIRST APPEARING CALL BUSIES THE STATION TO ALL SUBSEQUENT CALLS

1. *ICBL call appearing first*

In incoming ICBL call on an ICBL trunk appears at a hunting circuit 51 which finds an idle incoming ICBL circuit, e.g., line circuit 5. Relay 4R5 is energized in response to ringing current applied to its secondary winding and locks up upon itself over an obvious path which includes its primary winding, and selects an idle –LK– delay in the matrix row associated with line circuit 5 (4LK–E1, 5LK–E2 . . . 5LK–E10) by applying battery to one terminal of all the –LK– relays and by applying ground through an unoperated transfer contact of a relay –PB– in a key set line circuit. The particular position busy relay transfer contacts that are utilized determine the matrix column of the selected –LK– relay. It will be assumed that only key station 2 is idle and therefore every relay –PB– except 3PB2 is energized. In this event, the ground from incoming ICBL line circuit 5 which is first connected to the transfer contacts of energized relay 3PB9 in key set line circuit 29 (not shown), cannot be connected to conductor *h9* to energize relay 5LK–E9 (not shown) but rather is connected through the operated transfer contact of relay 3PB9 to the first unoperated relay –PB– transfer contacts. (Note that the ground from each incoming line circuit, 1 through 5, is applied through a diode such as diode 91 in line circuit 1, to every other key set line circuit beginning with 21 and ending with 29.)

Since relays 3PB8 through 3PB3 (not shown) are also energized the ground is connected successively to and through the transfer contacts of the various –PB– relays associated with line circuits 28 through 23 (not shown) respectively. Finally, upon reaching the transfer contacts of unenergized relay 3PB2 in line circuit 22, the ground is connected to conductor *h2* to energize relay 5LK–E2 in a manner described previously. Thereafter relay 3PB2 is energized as a result of the energization of relay 5LK–E2 thereby busying key station 2 to both all subsequent ICBL and all subsequent "customer" calls. No subsqeuent ICBL calls may be connected to key station 2 because energized relay 5LK–E2 prevents the energization of any other –LK– relays in matrix column 2 as described previously, also because the transfer contacts in line circuit 22 of energized relay 3PB2 acts in the manner just described to pass any incoming calls to the nearest idle adjacent key station. In addition to this, the terminal position J2 at the manual PBX corresponding to key station 2 is indicated busy by grounding sleeve lead SL2 and by the light of lamp L2.

The talking and ringing conductors are connected through from line circuit 5 to key set 2 by the make contacts of relay 5LK–E2.

2. *"Customer" call appearing first*

An incoming "customer" request for service is received by the PBX attendant who proceeds to scan for an idle terminal position corresponding to an idle key station. The scanning technique includes visual inspection for lighted lamps and electrical testing for any ground appearing on a sleeve lead and associated terminal. Assuming key station 1 is found idle, connection is made thereto by inserting a jack plug into the terminal receptacle. Once the connection is established in this manner, a detector comprising a diode rectifier 94 driving a transistor switch 34 which, in turn, drives a line relay 2L, is energized in response to a change of potential appearing on the ring conductor. The detector thereupon causes the energization of the position busy relay 2PB1 associated with key station 1 and also initiates the lamp flash and ringing functions at key station 1. The operation of relay 2PB1 causes its respective key station to appear busy to both subsequent incoming customer calls and ICBL calls in a fashion as described above.

My invention, described above, thus prematurely busies an entire key station in response to an incoming call at any one of its key positions by having a position busy relay associated with each such key station operate even before the call is answered or lamp flash or ringing signals are applied thereto. Once the position busy relay has been operated, it provides the immediate indication that the key station with all other lines appearing thereon has been seized, or is made busy, to both the customer, or manual PBX connection, and the automatically connected ICBL connection. This is accomplished by providing a ground on the sleeve lead and a lighted lamp at the jack position for the manually connected call and also by providing a means for transferring the attempted connection to an adjacent idle outgoing key set line circuit. Moreover, the selection of the matrix position relay corresponding to the selected idle key set acts to prevent any subsequent attempted connection to the seized line circuit and key set.

It is to be understood that the above-described arrangements are illustrative of the application of the principles of the invention. Numerous other arrangements may be devised by those skilled in the art without departing from the spirit and scope of the invention.

What is claimed is:

1. In a line circuit for a key telephone system including a key telephone set, a first and a second line terminating in said telephone set, first means responsive to a terminating call on said first line, and second means responsive to a terminating call on said second line, said first means comprising means for immediately indicating a busy condition on said first line and means for transmitting a permature busy signal to said second means prior to an answer condition on said first line for inhibiting subsequent connections to said telephone set on said first and second lines while said terminating call subsists on said first line.

2. In a line circuit for a key telephone system including a key telephone set, a first and a second line terminating in said telephone set, a first and a second means responsive to a terminating call on said first and second lines, respectively, said first means including detector means responsive to a terminating call on said first line, and control means common to said first and second means responsive to said detector means for precluding subsequent connections to said telephone set on said first and second lines prior to an answer condition on said first line and immediately after said terminating call is detected.

3. A line circuit for a key telephone system including a plurality of key telephone sets capable of indicating a terminating call thereat, signaling means individual to each of said key sets and responsive to a terminating call at said key set to give a signal indication thereat, a first and a second line terminating in each said key set, a first and a second means responsive to a terminating call on said first and second lines respectively, said first means comprising detector means including transistor switch means and relay means for electrically detecting a terminating call on said first line on one of said key sets prior to any signal indication on said busy indicator means at said key set, and telephone set busy means responsive to both said detector means and to said second means to inhibit said first and second means and prevent subsequent connections to said first and second lines.

4. A line circuit for a key telephone system including a plurality of key telephone sets; a first and a second line terminating in each of said sets; a first and a second means responsive to a called condition on said first and second lines respectively for establishing a connection to said first and second lines at said key sets; and key set busying means including relay means individual to each of said key sets responsive to said first means to busy said called key set prior to an answer condition on said first line and substantially concurrently with the extension of a connection to said first line, and selector means responsive to said second means for actuating said busying means and for transferring any subsequent attempted connections to said second line on said called key set to an idle one of said plurality of key sets.

5. A key telephone system including a plurality of key telephone stations, a manually connected line terminated at each of said telephone stations, an automatically connected line terminated at each of said telephone stations, a first means responsive to a called condition on said manually connected line including busy indicator means individual to said key telephone station, a second means responsive to a called condition on said automatically connected line including switching matrix means, and key station busying means including relay means responsive to said first and to said second means to preclude any connection to a called station subsequent to the establishment of a first connection and prior to an answer condition on said first connected line, said busying means including means for energizing said busy indicator means individual to said manually connected line and means for diverting a subsequent attempted connection to said automatically connected line on said called station to an automatically connected line on an idle one of said plurality of key stations.

6. A key telephone system in accordance with claim 5 including in addition a line circuit in said first means comprising detector means including transistor switch means for controlling said relay means to electrically indicate a call terminating on said manually connected line on one of said key stations prior to signaling of said called station.

7. A key telephone system including a plurality of key telephone stations; ringing means, signaling means in said stations including visual and audible indicating means responsive to said ringing means, a first and a second line terminating in each of said stations; a first means responsive to a terminating call on said first line including means for manually establishing a connection to a called station, detector means including rectifier means, transistor switch means and first relay means, said rectifier means coupled to said transistor switch means for controlling said first relay means responsive to said ringing means; a second means responsive to a terminating call on said second line including switching matrix means for establishing a connection to a second line on a called station; call diverting means for transferring to an idle station any subsequent attempted connection to said second lines; electrical and sensory busy line indicator means individual to each of said first lines; and key station busying means responsive to a terminating call on said first or said second line prior to an answer condition thereon including second relay means responsive to said detector means and to said second means to energize said electrical and sensory busy line indicator means and to enable said diverting means prior to enabling said visual and audible indicating means and to preclude any connection to a station subsequent to the establishment of said terminating call on either said first or said second line.

References Cited by the Examiner

UNITED STATES PATENTS

| | | | |
|---|---|---|---|
| 2,574,224 | 11/1951 | Oberman | 179—18 |
| 2,866,005 | 12/1958 | Kupferle | 179—18 |
| 3,239,610 | 3/1966 | Morse et al. | 179—42 |

KATHLEEN H. CLAFFY, *Primary Examiner.*

L. A. WRIGHT, *Assistant Examiner.*